United States Patent [19]

Lampus

[11] Patent Number: 4,786,451
[45] Date of Patent: Nov. 22, 1988

[54] A METHOD OF MANUFACTURING A METALLURGICAL ADDITION AGENT

[75] Inventor: Donald L. Lampus, Pittsburgh, Pa.
[73] Assignee: Doren, Inc., Pittsburgh, Pa.
[21] Appl. No.: 578,635
[22] Filed: Feb. 9, 1984
[51] Int. Cl.[4] .......................... B28B 3/00; B28B 3/02
[52] U.S. Cl. ........................................ 264/87; 264/86; 264/101; 264/232; 264/333; 264/340; 264/DIG. 43; 75/48; 75/53
[58] Field of Search .......... 264/86, 87, 101, DIG. 36, 264/232, 333, 340, DIG. 43; 75/48, 53

[56] References Cited

U.S. PATENT DOCUMENTS

| | | | |
|---|---|---|---|
| 2,584,109 | 2/1952 | Blackburn et al. | 264/86 |
| 3,027,227 | 3/1962 | Coxey | 23/88 |
| 3,051,564 | 8/1962 | Drenning | 75/53 |
| 3,174,846 | 3/1965 | Brisse et al. | 75/3 |
| 3,655,847 | 4/1972 | Morgan | 264/101 |
| 3,871,869 | 3/1975 | Overdijk et al. | 75/53 |
| 4,128,417 | 12/1978 | Ling | 75/3 |
| 4,148,627 | 4/1979 | Haley | 75/3 |

FOREIGN PATENT DOCUMENTS 0419387 8/1974 U.S.S.R. .................. 264/86
0700332 11/1979 U.S.S.R. .................. 264/101

*Primary Examiner*—Jan H. Silbaugh
*Assistant Examiner*—Hubert C. Lorin
*Attorney, Agent, or Firm*—Webb, Burden, Ziesenheim & Webb

[57] ABSTRACT

A method of manufacturing a metallurgical addition agent, especially an agent comprising silicon carbide fines, comprises a first step of forming a mix of at least 30% fines, cement and at least 20% water. The next step comprises pressing the wet mix in a mold while squeezing out excess water but leaving sufficient water for hydration of the cement. The pressed shapes are cured at ambient temperatures.

8 Claims, 1 Drawing Sheet

A METHOD OF MANUFACTURING A METALLURGICAL ADDITION AGENT

BACKGROUND OF THE INVENTION

My invention relates to a method for producing metalurgical addition agents and more particularly, a method of producing metallurgical addition agents such as silicon carbide which method employs a high percentage of fines as the staring material.

A number of manufacturing processes develop fines as a by-product which, if consolidated, can be used in melting furnaces and the like as alloy additions. Various processes for consolidating these fines are known and certain of these processes use cement as a binder. For example, U.S. Pat. No. 3,174,846 teaches a method of briquetting iron oxide fines through a standard roll-type briquetting press. U.S. Pat. No. 4,148,627 teaches a method of agglomerating particulate steel mill wastes, such as roll scale and coke fines by mixing the materials with Portland cement and casting into slabs which are thereafter broken and screened for charging into the furnace.

U.S. Pat. Nos. 3,871,869 and 3,027,227 are directed to method for pressing briquettes from fine grained fluorspar in which cement is a binder.

A particularly important metallurgical addition agent is silicon carbide which has a number of applications in the manufacture of cast irons and steels. U.S. Pat. No. 3,051,564 teaches a composition for making silicon carbide briquettes, which composition includes metallurgical grade silicon carbide and Portland cement.

It is also known to make silicon carbide on concrete block machines using cement as a binder. The shortcoming of using the concrete block machinery, is that only up to 25% fines can be employed because the machinery becomes "gummed" with the fines and will not function properly. Other processes which employ fines in excess of 25% utilize briquetting rolls and require elevated temperature cures to effect a proper consolidation.

SUMMARY OF THE INVENTION

I have found that I can utilize up to 100% fines of the metallurgical addition agent in the manufacture of a readily usable product. In the manufacture of my product, I eliminate the dust normally associated with fines and where an oxidizable element forms a part of the fines, I minimize the oxidation thereof. I also provide a product which can be cured at ambient temperatures and is easily handlable.

My method of manufacturing a metallurgical addition agent such as silicon carbide consists of forming a wet mix of at least 30% by weight fines and cement in an amount sufficient to bind the solids in a unified mass and at least 15% water. The wet mix is then fed into a mold of a press having a predefined size and shape and the mix is thereafter dewatered in the press by causing a ram to pass into the mold and squeezing the excess water out leaving sufficient water for hydration in the cement. Thereafter the dewatered mix is stripped from the mold and is cured at ambient temperatures, allowing for hydration of the cement. The fines are those that pass through a minus 100-mesh screen and the fines are normally present in amounts between 30–85% of the total mix. At least 700 psi is needed for the minimum fine content; about 1000 psi is needed for 50% fines; and about 1200 psi is needed for 70% and greater fines.

DESCRIPTION OF THE PREFERRED EMBODIMENTS

My method is applicable to a large number of metallurgical addition agents which are present in the form of fines, normally as a by-product or waste from some other manufacturing process. My method has particular application to silicon carbide which is an addition agent for steel and cast irons. The major ingredients are the fines which are present in amounts in excess of 30% by weight. In the case of silicon carbide fines, there are a number of sources such as the refuse from electric furnace electrodes, gas collector fines and wire saw pond fines where silicon carbide is utilized with a wire saw to cut granite and the like. By fines I mean those which will pass through a minus 100-mesh screen. Silicon carbide fines can comprise the entire solids in the mix. In the case where cement is the binder, the fines may be present in an amount between 30% to 85% by weight. Other solids can be used with the fines. For example, metallurgical grade silicon carbide in lump form may make up the balance of the solids in the mix.

The binder for these fines is Portland cement typically of the type referred to as Type 3 cement. Small quantities of a plasticizer to aid in hydration can also be employed. While other binders may conceivably be used, cement is clearly preferred because of its compatibility and ability to function with the high water contents which permit use of the high pressure, dewatering presses employed.

The mix includes sufficinet water to hydrate the cement. Normally 25 pounds of water are needed for every 100 pounds of cement as the minimum water content to hydrate the cement and I prefer to utilize 35 pounds of water per 100 pounds of cement to assure proper distribution of the water among the solids.

The process may be carried out on a concrete press such as a Fielding concrete press which is a 400 ton press capable of pressures on the other of 1250 psi.

Figure 1:
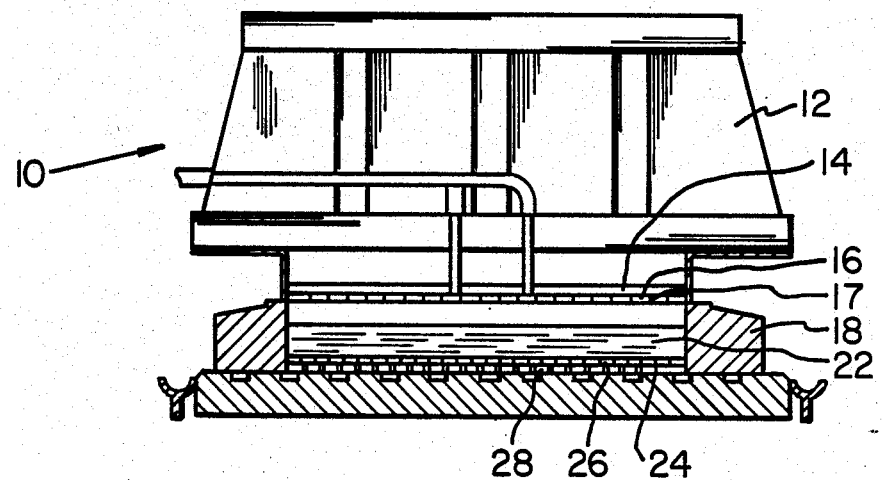
FIG. 1 is a perspective view of a silicon carbide slab made by my method.

Such a press 10 is illustrated in FIG. 1. The press 10 consists of a pressing head 12, a die face plate 14, a perforated top plate 16 and a top filter media 17, all of which interact with mold 18 having side liner plates 20 to define the mold cavity for the product 22. A bottom filter media 24, a bottom perforated plate 26 and a bottom forming plate 28 make up the mold bottom. The loading system, vacuum system, ejection system, hydraulic system and other minor systems are not shown or appear in minor detail.

The mix containing sufficient water for hydration of the cement is measured out and dispensed into the machine mold which is lined with the top plate filter 16. A sheet of porous filter media 17 is positioned on top of the mix. The press 10 is actuated so that a hydraulic ram presses down into the mold squeezing out the excess water through the perforations in the bottom plate 26. That drainage may be assisted by means of a vacuum and when the pressing operation is complete, the product is ejected from the mold 10 and any filter media are removed. The product is then stacked on pallets and cured at room temperature, generally for a minimum of 8 hours.

Figure 2:
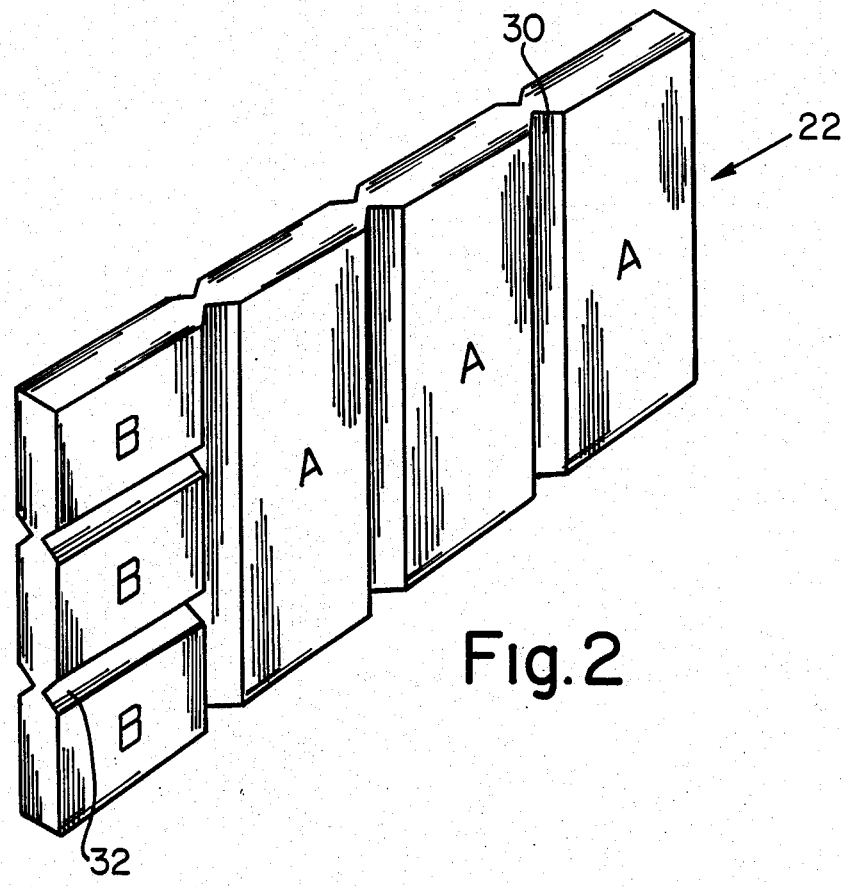
FIG. 2 is a front view of a hydraulic press which can be used to carry out my method.

The mold may contain integral ribbing so that grooves are formed in the final product to facilitate breaking into smaller pieces where desired. Such a product 22 is illustrated in FIG. 2. A first series of parallel grooves 30 divide the slab into a plurality of sgements A and a second set of parallel grooves 32 divide one of the segments A into smaller segments B.

A typical mix design used to make segmented slabs 24"×30" and weighing 120 pounds of a silicon carbide metallurgical alloy addition having a guaranteed 65% silicon carbide content plus or minus 3% is as follows:

- 280 pounds of Type 3 cement
- 1500 pounds of 73% silicon carbide dust collector fines
- 280 pounds of 77% ⅜" by down metallurgical grade silicon carbide in bulk
- 50 pounds of 7% 10-mesh silicon carbide bagged abrasive rejects
- 10 ounces of a plasticizer to aid in hydration 1136 pounds of water The above mix was pressed on the Fielding concrete press. The slab upon ejection from the mold and before hydration weighted 129 pounds with 15% water. After the slab was cured at ambient temperatures for 24 hours the slab weighed 120 pounds. The single slab was grooved as shown in FIG. 2 so that four 30 pound smaller slabs were obtained upon breaking of the larger single slab. The above slabs were then successfully used as a metallurgical addition agent in the manufacture of ductile cast iron.

To achieve on the order to 15% water after pressing and before curing, I have found that the pressure on the slab is a function of the percentage of fines in the mix. When the fines make up only 30% of the mix, 700 psi pressure on the slab is needed. At 50% fines about 1000 psi pressure on the slab is needed and at 70% and greater fines the pressure should be on the order of 1200 psi on the slab.

I claim:

1. A method of manufacturing a metallurgical addition agent comprising:
    A. forming a wet mix of at least 30% by weight fines of a metallurgical addition agent substance, said fines passing a 100-mesh screen, cement in an amount sufficient to bind the solids in a unified mass and at least 20% by weight water said water being in excess of that required for complete hydration of the cement;
    B. feeding said wet mix to a mold of a press, said mold having a predefined size and shape;
    C. pressing and dewatering said mix in the press by causing a ram to pass into the mold and squeezing excess water out so as to leave sufficient water for hydration of the cement;
    D. removing said dewatered mix from the mold; and
    E. curing said dewatered mix at ambient temperatures thusly allowing for hydration of the cement.

2. The method of claim 1, said metallurgical addition agent substance being silicon carbide and said fines being silicon carbide fines.

3. The method of claim 2, said dewatering including eliminating said water through perforations in the press.

4. The method of claim 2 wherein said fines being in an amount between 30% to 85% by weight.

5. The method of claim 2, wherein said pressing said mix being with a pressure of at least 700 psi.

6. The method of claim 2 wherein said forming a wet mix being of at least 50% fines and said pressing said wet mix being with a pressure of at least 1000 psi.

7. The method of claim 2 wherein said forming a wet mix being of at least 70% fines and said pressing said wet mix being at a pressure of at least 1200 psi.

8. The method of claim 3, including positioning a porous filter media atop the filled mold and assisting said dewatering by top-draining through vacuum means

* * * * *